(12) United States Patent (10) Patent No.: US 8,915,423 B1
Daniel (45) Date of Patent: Dec. 23, 2014

(54) SYSTEM AND METHOD FOR VERIFYING AN INDIVIDUAL'S AUTHORIZATION TO CROSS BORDERS

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 13/968,582

(22) Filed: Aug. 16, 2013

Related U.S. Application Data

(63) Continuation-in-part of application No. 13/041,974, filed on Mar. 7, 2011, now Pat. No. 8,517,263.

(51) Int. Cl.
*G06K 5/00* (2006.01)
(52) U.S. Cl.
CPC .................................. *G06K 5/00* (2013.01)
USPC .......................................... 235/375; 235/380
(58) Field of Classification Search
CPC ..... G06F 21/31; G06F 21/123; G06F 21/121; G06F 2221/2149; G06F 2221/2133
USPC .................................................. 235/375, 380
See application file for complete search history.

(56) References Cited

U.S. PATENT DOCUMENTS

| | | | |
|---|---|---|---|
| 6,776,332 B2 * | 8/2004 | Allen et al. ................... 235/380 |
| 2002/0095587 A1 * | 7/2002 | Doyle et al. .................. 713/186 |
| 2003/0172090 A1 * | 9/2003 | Asunmaa et al. ............. 707/200 |
| 2004/0050930 A1 * | 3/2004 | Rowe ............................. 235/380 |
| 2005/0212657 A1 * | 9/2005 | Simon .......................... 340/5.74 |
| 2005/0225444 A1 * | 10/2005 | Clift et al. ................ 340/539.13 |
| 2006/0107067 A1 * | 5/2006 | Safal et al. .................... 713/186 |
| 2008/0309490 A1 * | 12/2008 | Honkanen et al. ......... 340/572.1 |
| 2009/0292641 A1 * | 11/2009 | Weiss .............................. 705/66 |

OTHER PUBLICATIONS

Notice of References Cited in Office Action dated Aug. 15, 2012, p. 1 of 1, U.S. Appl. No. 13/041,974, filed Mar. 7, 2011.

* cited by examiner

*Primary Examiner* — Allyson Trail
(74) *Attorney, Agent, or Firm* — Carol N. Green, Esq.

(57) ABSTRACT

The present disclosure relates generally to a system and method, for verifying an individual's authorization to enter into a country's borders using an electronic data card with at least one biometric identifier stored thereon for identifying the card holder. The system and method includes biometric verification means for validating at least one biometric sample that is compared with the at least one biometric identifier stored on the electronic data card when the electronic data card is within a predetermined spatial proximity to the card reader. Upon validation of the biometric sample, the electronic data card releases the card holder's information to the card reader, which receives and transmits the information to a computer processor for determining the card holder's travel authorization.

22 Claims, 10 Drawing Sheets

SYSTEM AND METHOD FOR VERIFYING AN INDIVIDUAL'S AUTHORIZATION TO CROSS BORDERS

PRIORITY CLAIM

This patent application is a continuation in part of, and claims priority to United States Non-Provisional patent application Ser. No. 13/041,974 titled "System And Method For Verifying An Individual's Authorization To Cross Borders Using An Electronic Card With Biometric Controls" filed Mar. 7, 2011. The entire disclosure of the afore-mentioned patent application is incorporated by reference as if fully stated herein.

FIELD OF THE INVENTION

The present disclosure relates generally to a system and method, for verifying an individual's authorization to enter into a country's borders using an electronic data card with at least one biometric identifier stored thereon for identifying the card holder. The system and method includes biometric verification means for validating at least one biometric sample that is compared with the at least one biometric identifier stored on the electronic data card when the electronic data card is within a predetermined spatial proximity to the card reader. Upon validation of the biometric sample, the electronic data card releases the card holder's information to the card reader, which receives and transmits the information to a computer processor for determining the card holder's travel authorization.

BACKGROUND OF THE INVENTION

In the wake of the terrorist attacks of Sep. 11, 2001 many developed countries have implemented new security measures with more stringent rules in an effort to minimize and/or eliminate the threat of terrorism within their country's borders. One such recent measure in the United States of America is the enactment of the REAL ID Act, from which the enhanced driver's license program was developed as a means of reducing fraud, improving the reliability and accuracy of identification documents that state government's issue. However, the enhanced driver's license is still vulnerable to being tampered with and being counterfeit-resistant. Thus, there needs to be a secure means of authenticating the identity of the card holder that overcomes these limitations.

Further, when a traveler is cleared for international departure, e.g. at an airport check-in counter, it is presumed that the traveler proceeds through security to the respective departure gate. However, other than bodily surveillance or reviewing videos after the fact, airport security has little assurance of the traveler's whereabouts in the airport once he/she leaves the check-in counter, or security. Thus, there needs to be a system and method of tracking the traveler's whereabouts to help ensure that he/she boarded his/her scheduled departure flight.

Accordingly, the various embodiments and disclosures described herein satisfies these long felt needs and solves the limitations of the prior art in a new and novel manner.

SUMMARY OF THE INVENTION

The system and method disclosed herein comprises of an electronic data card configured for electronically storing thereon at least one or more biometric identifiers used to identify a card holder; biometric verification means in electronic communication with a computer processor that receives at least one biometric sample and validates the at least one biometric sample from the card holder with the at least one biometric identifier stored on the electronic card; a card reader in electronic communication with the computer processor, biometric verification means and the electronic data card, wherein the card reader is configured for activating the electronic data card only when the electronic data card is within a predetermined spatial proximity to the card reader and the at least one biometric sample is validated with the at least one biometric identifier, wherein only upon validation of the at least one biometric sample, the electronic data card releases the immigration information to the card reader, which receives the immigration information and transmits it to the computer processor for determining the at least one card holder's travel authorization.

System and method further comprises of an application program executable on a computer; and computer executable instructions executable by at least one computer processor and configured for performing any one or more of the following: controlling the card reader to activate the electronic data card for releasing the electronic data stored thereon; controlling the card reader for receiving the immigration information upon validation of the biometric sample; and controlling the card reader to transmit the immigration information to the computer processor for verification of the at least one card holder's travel authorization.

The electronic data card is selected from the group of electronic devices comprising essentially of smart cards, memory cards and processor cards. The electronic data card includes memory means, wherein memory means may include any one or more of the following stored thereon: card number, security parameters, card validation information, activity log, global positioning system location information, at least one biometric sample, at least one biometric identifier, identification information or immigration information. Identification information includes but is not limited to: name, address, date of birth, sex, issue date, and height and other like identification information. Immigration information includes but is not limited to: travel authorization that may include for instance issuing state, expiration date, and endorsement, background report, visa restrictions as well as any other like immigration information that is well known and used in the arts.

Biometric verification means as used herein includes but is not limited to: fingerprint recognition means, hand geometry recognition means, palm geometry recognition means, iris recognition means, retina recognition means, and speech recognition means.

The electronic data card is configured for communicating with the computer or the card reader in any of the following manner: wirelessly or wired and for being accessed by the application program executable by the computer. The predetermined proximity is programmable for a range comprising of 1 to 1.5 inches from the card reader.

Method comprises of electronically storing at least one biometric identifier used to identify a card holder on an electronic data card; receiving at least one biometric sample using biometric verification means that is in electronic communication with a computer processor; validating the at least one biometric sample with the at least one biometric identifier stored on the electronic data card; activating the electronic data card only when the electronic data card is within a predetermined spatial proximity to the card reader and the at least one biometric sample is validated with the at least one biometric identifier; and releasing the immigration information to the card reader upon activation of the electronic data card, wherein the card reader receives the immigration information and transmits it to the computer processor for determining the at least one card holder's travel authorization.

In some embodiments, method comprises of plotting a tracking route to departure gates for the authorized card holder; reading the electronic data card by one or more card readers positioned along the tracking route, generating location activity log; and determining authorization for the electronic data card at any one specific location. In some embodiments, method further comprises storing the electronic card's location activity log as tracked and issuing an alarm for detected unauthorized presence of the electronic card and ultimately the card holder at a specific location.

In some embodiments, method comprises of activating an electronic data card, where upon activation the electronic data card validates at least one biometric sample, recently received from card holder via biometric verification means with at least one biometric identifier stored on the electronic data card and releases card holder's information to a card reader; and receiving the card holder's information stored on the electronic data card upon validation of the biometric sample. Method may also further comprise of accessing law enforcement records for determining the card holder's authorization to enter a country's borders.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the system and method may be derived by referring to the detailed description and claims when considered in connection with the Figures, wherein like reference numbers refer to similar items throughout the Figures.

DETAILED DESCRIPTION OF THE PREFERRED EMBODIMENT

System Level Overview

Figure 1A:
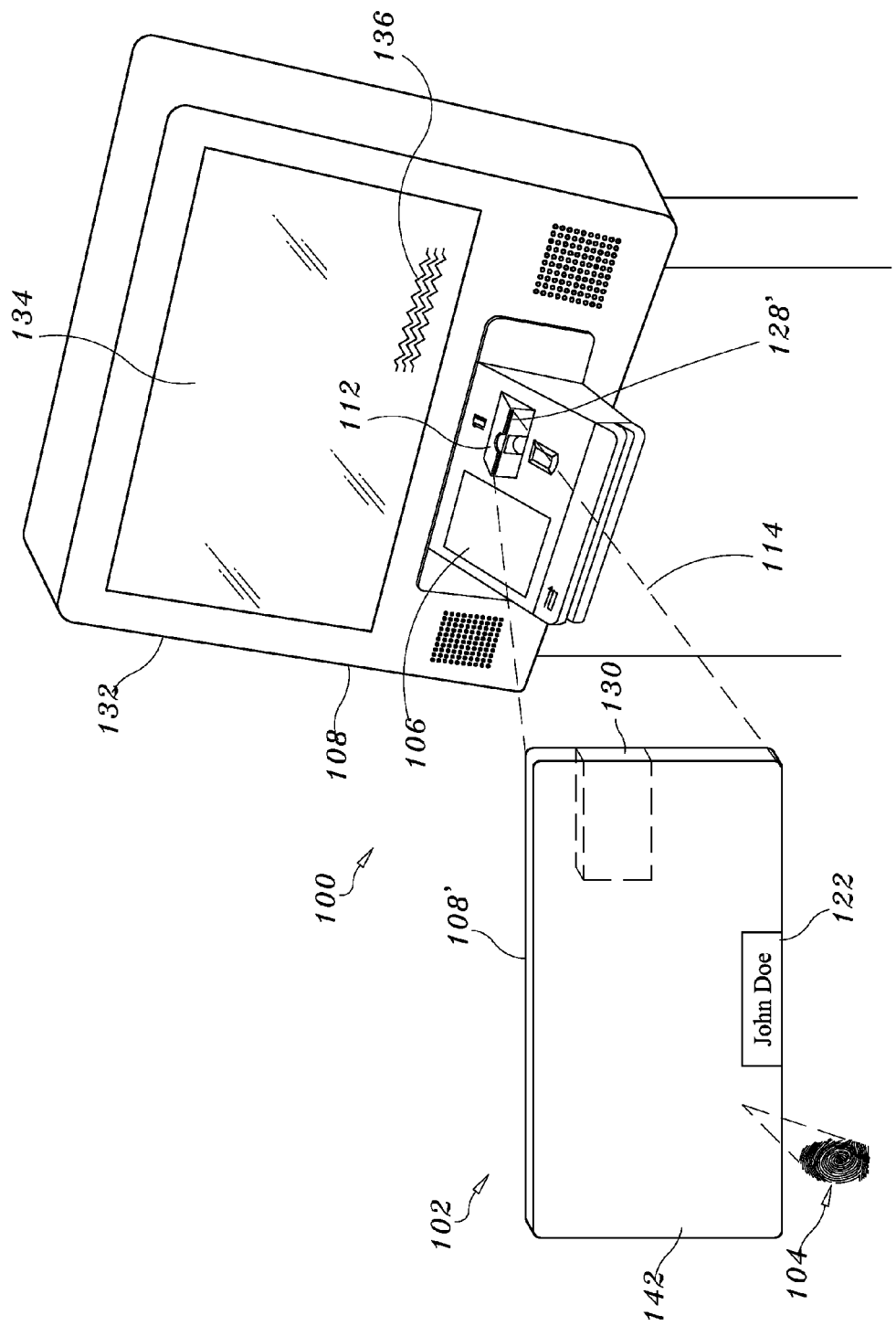
FIG. 1A is an illustrative diagram of an exemplary embodiment of the system using an illustrative electronic data card.

The following discussion describes in detail, varied embodiments of the system 100 and methods disclosed herein. However, this discussion should not be construed, as limiting the invention to those particular embodiments, as practitioners skilled in the art will appreciate that the system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the various views.

FIG. 1A is an illustrative diagram of an exemplary embodiment of the system 100 using an illustrative electronic data card 102. System 100 comprises of an electronic data card 102, configured for electronically storing thereon at least one or more biometric identifiers 104, 104' used to identify a card holder; biometric verification means 106 in electronic communication with a computer processor 108 that receives at least one biometric sample 110 (as shown in FIG. 1C) from the card holder and validates the biometric sample 110 received with the at least one or more biometric identifiers 104, 104' stored on the electronic data card 102; and a card reader 112 in electronic communication with the computer processor 108, biometric verification means 106 and the electronic data card 102, wherein the card reader 112 is configured for activating the electronic data card 102 only when the electronic data card 102 is within a predetermined spatial proximity 114 to the card reader 112 and the at least one biometric sample 110 is validated with the at least one or more biometric identifiers 104, 104' stored on the electronic data card 102, wherein only upon validation of the at least one biometric sample 110, the electronic data card 102 releases the immigration information 116 stored thereon to the card reader 112, which receives the immigration information 116 and transmits it to the computer processor 108 for determining the at least one card holder's travel authorization 118, e.g. to enter a country's borders.

Figure 1B:
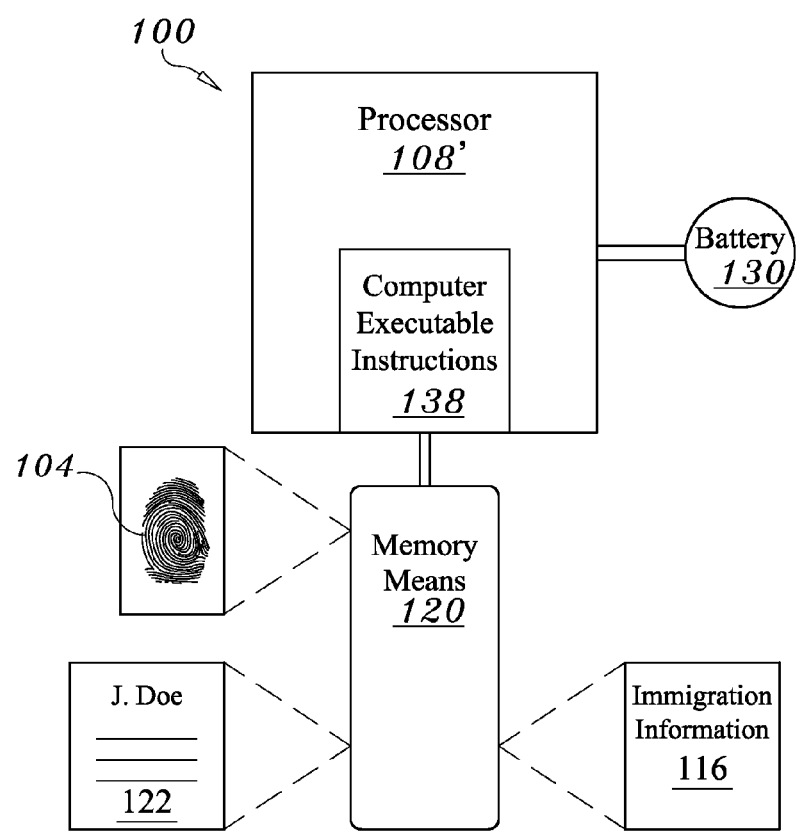
FIG. 1B is an exemplary embodiment of the electronic data card according to one embodiment.
Figure 1C:
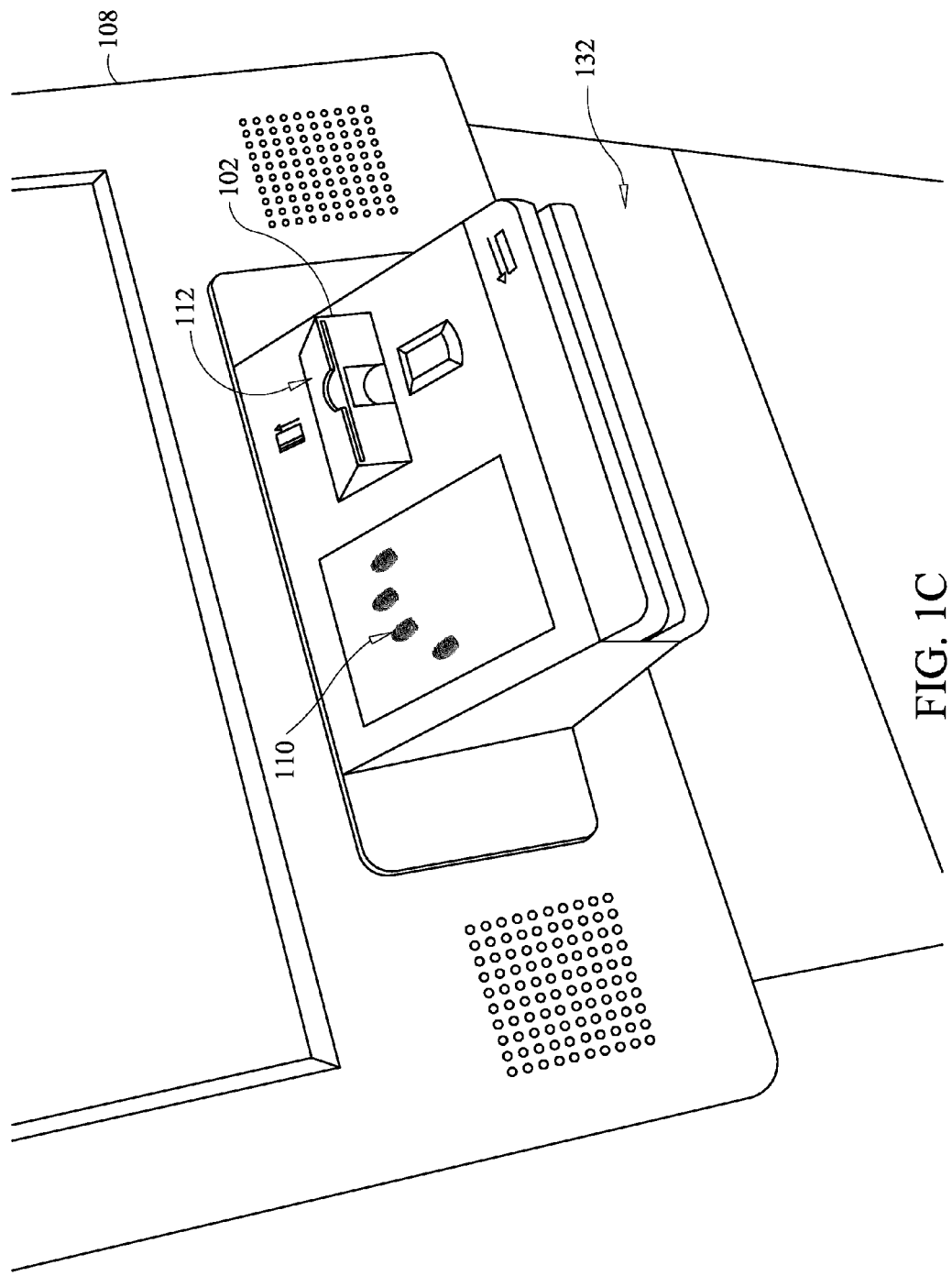
FIG. 1C is an exemplary embodiment of the system of the invention.

Electronic data card 102 is selected from the group of electronic devices consisting essentially of programmable smart cards, memory cards, and processor cards, which includes at least one memory means 120 embedded therein as exemplified in FIG. 1B. Prior to the electronic data card 102 being first used by the card holder as a means of verifying the card holder's travel authorization 118, card holder will need to initially submit at least one or more biometric samples 110, 110' (as shown in FIG. 1C) that are electronically stored and enrolled thereon as biometric identifiers 104, 104'. Biometric identifiers 104, 104' are used to uniquely identify the individual based on his/her intrinsic physical traits, e.g. fingerprints, retina scan, palm geometry, hand geometry, speech, and or other biometric identifiers 104, 104' that are used in the arts.

FIG. 1B is an exemplary embodiment of the electronic data card 102 according to one embodiment. As shown in FIG. 1B, the electronic data card 102 includes a computer processor 108' electronically connected to its memory means 120. Computer processor 108' as discussed throughout may be any type of computer processor, such as, but not limited to, a central processing unit (CPU), a microprocessor, a video processor, a front end processor, a coprocessor, a single-core processor, a multi-core processor, as well as any known computer processor 108 that's used in the arts.

Memory means 120 is configured for storing temporarily or permanently any one or more of the following thereon: at least one biometric sample 110, at least one or more biometric identifiers 104, 104', identification information 122, immigration information 116, which includes but is not limited to travel authorization 118 that may include for instance issuing state, expiration date, and endorsement, background report 124, visa restrictions 126, and/or other immigration information 116 that are normally used in the arts. Identification information 122 as used herein includes any one or more of the following: name, address, date of birth, sex, issue date, height and the like.

Memory means 120 may include a hardware component, e.g. storage hardware, in electrical communication with at least one computer processor 108. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 120 may comprise of both hardware and software components. In some embodiments, at least one memory means 120 may be embedded within at least one computer processor 108' where the information stored thereon is encrypted for privacy purposes. In other embodiments, the at least one memory means 120 is adapted with electrical contacts 128, for establishing wired and/or wireless connectivity with external devices, e.g. a computer processor 108, via for example a microchip and/or at least one microcomputer processor 108 where the memory means 120 is embedded within.

Figure 1D:
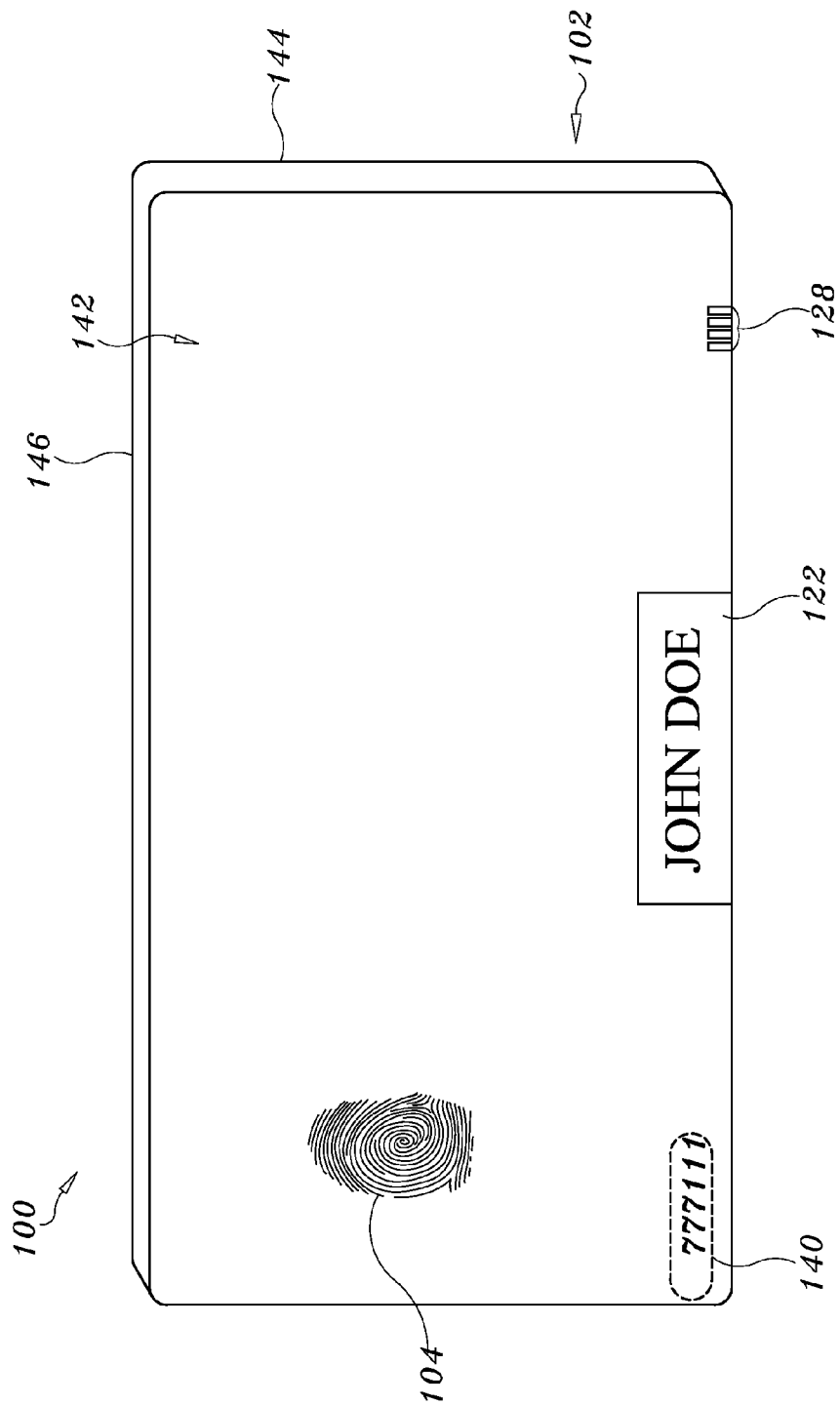
FIG. 1D is an exemplary embodiment of the electronic data card according to one embodiment.

In some embodiments, electronic data card 102 may optionally include a battery 130, which serves as a power source for the at least one microprocessor 108' positioned therein. In some embodiments, electronic data card 102 is adapted with electrical contacts 128 (as shown in FIG. 1D) for establishing wired connectivity to the card reader 112, and as such may not include a battery 130. In that event, computer processor 108' detects the established connection between the electronic data card 102 and card reader 112 and derives power from the card reader 112 to encrypt the electronic data being stored in the electronic card's memory means 120 as well as providing access to the immigration information 116 and the biometric identifiers 104, 104' stored thereon for validation with the biometric sample 110 or authorization of card holder to cross borders. While in some embodiments, the electronic data card 102 includes a computer microprocessor 108' positioned within, in other embodiments the electronic data card 102 may not include a processor 108'.

FIG. 1C is an exemplary embodiment of the system 100 of the invention. System 100 includes biometric verification means 106 in electronic communication with a computer processor 108, wherein the biometric verification means 106 is configured for receiving a current cardholder's biometric sample 110 in person, and validating the at least one biometric sample 110 with the at least one or more biometric identifiers 104, 104' previously stored on the electronic data card 102. Biometric verification means 106 include but is not limited to: fingerprint recognition means, hand geometry recognition means, palm geometry recognition means, iris recognition means, retina recognition means, speech recognition means and any other biometric verification means 106 that are known and used in the arts.

In some embodiments, biometric verification means 106 may be disposed in communication with a computer processor 108 and for example, a fingerprint scanner, hand geometry scanner, a palm geometry scanner, iris scanner, retina scanner, or a user interface, which includes an audio receiving circuit capable of receiving audio signals at predetermined frequencies and/or with additional hardware complete with electronic circuitry and such other biometric verification means 106 that are known and used in the arts. Illustratively, as seen in FIGS. 1A & 1C, biometric verification means 106 includes a fingerprint scanner, where the computer processor 108 controls the functionality of the fingerprint scanner, generating the varied algorithms for storage of the initial valid biometric samples 110, 110' stored thereon as biometric identifiers 104, 104' and validates images of subsequent biometric samples 102, 102' received from the card reader 112 with the one or more biometric identifiers 104, 104' stored thereon.

In some embodiments the biometric verification means 106 is a discrete stand-alone device in electronic communication with the computer processor 108, while in others, biometric verification means 106 may be housed in an electronic kiosk 132 in electronic communication with an attached card reader 112. Kiosk 132 as used herein, references an open, electronic, computerized booth for which the at least one computer processor 108 is positioned within. Kiosk 132 may be adapted to include a card reader 112 and a computer terminal with display screen 134 with computer software and hardware to perform the varied functions of the systems 100 and methods disclosed herein, e.g. displaying images of biometric samples 110, 110' or identifiers 104, 104' thereon. In some embodiments, the electronic kiosk 132 may be interactive without allowing the individual to access the system 100 functions, e.g. check in for international travel, while in other embodiments, kiosk 132 is not interactive. Kiosk 132 as used herein may include touch screens, trackballs, computer keyboards, and pushbuttons and the like, typically used as information booths and often located at malls and other large indoor or outdoor structures.

System 100 also comprises a card reader 112, which describes a device for scanning, reading and/or writing to the electronic data card 102 and the information stored thereon, e.g. at least one biometric sample 110, at least one or more biometric identifiers 104, 104', immigration information 116 including travel authorization 118, background report 124, visa restrictions 126, and/or any other electronic data stored thereon and the like that is used for verifying card holder's eligibility to cross into another country's borders. Card reader 112 as exemplified herein may be adapted with electrical contacts 128' for establishing wired connectivity to a plurality of electronic data cards 102, 102', and/or a computer processor 108.

Alternatively, a wireless connection may be established with either the computer processor 108 and/or the electronic data card 102, wherein communication access is established in response to a predetermined spatial proximity 114 or manual activation of the card reader 112. Card reader 112 may also be integrated within a computer processor 108 (e.g. with a slot for wired card connectivity), an external device (e.g., USB connection to a small housing), or be integrated into or with other devices, e.g. as shown the kiosk 132 not only includes the card reader 112 but also the biometric verification means 106. In some embodiments the card reader 112 is in electronic communication with a computer processor 108 but is a discrete, stand-alone device separate from the biometric verification means 106 that may be positioned at various locations within the airport for tracking a card holder's whereabouts. As such, the reading of the electronic data card 102 is automatic as it does not require the card holder to manually insert the electronic data card 102 at the various locations after the initial point of entry at the airport.

Card reader 112 and/or the electronic data card 102 may be programmed for activation of the electronic data card 102 or to be read only when the electronic data card 102 is within a programmable predetermined spatial proximity 114 to the card reader 112. In some embodiments, the predetermined proximity 114 is programmed to be any distance between 1 to 1.5 inches, where accessing the electronic card 102 at such close proximity helps minimize unauthorized skimming of the electronic data stored thereon. In other embodiments, predetermined proximity 114 may be programmed to be more or less than one (1) inch and/or one and a half (1.5) inches. As such, when the card 102 is within the programmed predetermined proximity 114, the electronic data card 102 is activated as soon as the card holder provides a valid biometric sample 110 that matches the biometric identifier 104 electronically stored thereon, causing the release of the electronic information stored thereon to the card reader 112 which transmits the information to the computer processor 108 for verifying the card holder's travel authorization 118. If the electronic data card 102 is within the predetermined proximity 114 and the biometric sample 110 fails to match the biometric identifier 104 stored thereon, the electronic data card 102 will not be activated and there is no transfer of the electronic data stored thereon. This feature provides added security such that if the electronic data card 102 is found and whereas in some embodiments it may not include any external indicia of the owner's visual identity and the finder tries to use the found electronic data card 102, the biometric sample 110 will not match the biometric identifier 104 stored thereon and the immigration information 116 and other authorization information stored on the electronic card 102 remains intact and will not be transferred.

In some embodiments, card reader 112 is in electronic communication with a computer processor 108, e.g. a network enabled computer processor 108 such as a laptop or personal digital assistant subject to wired/wireless connectivity that is configured with a software application program 136 stored thereon to facilitate communications between the electronic data card 102 and the computer processor 108 via the card reader 112. Application program 136 comprises of computer executable instructions 138 readable by the electronic card's processor 108 and or another processor 108' in electronic communication with for example the card reader 112. Application program 136 may comprise in part of a browser, such as for use on a personal computer or similar browsing device. The electronic data card 102 may also be configured for being accessed by the application program 136 that is executable on the computer.

Figure 2:
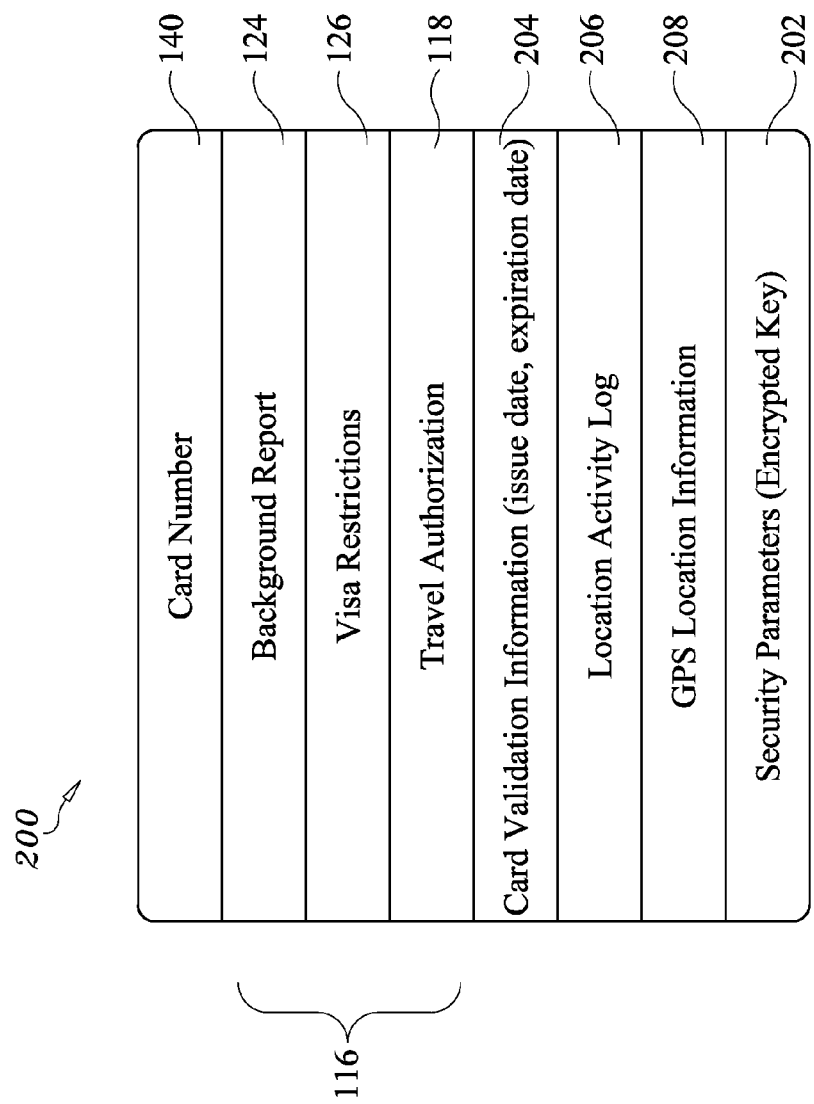
FIG. 2 illustrates, by way of example, collectively the electronic information stored within the electronic data card according to one embodiment of the system.

Computer executable instructions 138, 138' are executable by the computer's and the electronic data card's at least one computer processors 108, 108', and are operative to perform the varied system 100 functions and methods disclosed herein. Computer executable instructions 138, 138' may be loaded directly on the computer processor 108, 108' or may be stored in computer's' memory means 120', such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 138, 138' may be any type of computer executable instructions 138, 138', which may be in the form of a computer program, the program being composed in any suitable programming language or source code, such as C++, C, JAVA, JavaScript, HTML, XML, and other programming languages. Computer executable instructions 138, 138' executable by the at least one computer processor 108' is configured for performing any one or more of the following: plotting a tracking route 136 to at least one or more departure gate(s) for the authorized card holder; reading the electronic data card 102 by one or more card readers 112, 112' located along the tracking route 136; generating a location activity log 206 (as shown in FIG. 2); storing the location activity log 206 as tracked; determining authorization for the electronic data card 102 and by extension the card holder at any one specific location; issuing an alarm for detected unauthorized presence of the electronic data card 102 and as such the card holder at any one location; controlling the card reader 112 to activate the electronic data card 102 for validating the biometric sample 110; controlling the card reader 112 for reading and receiving the immigration information 116 stored thereon upon validation of the biometric sample 110 and/or controlling the card reader 112 to transmit the immigration information 116 to the computer processor 108 for verification of the at least one card holder's travel authorization 118.

FIG. 1D is an exemplary embodiment of the electronic data card 102 according to one embodiment. In some embodiments, electronic data card 102 may include an electronic data card number 140 stamped or engraved on the card's exterior 142, which uniquely identifies the card holder to the issuing state or country as a validly authorized card holder. Electronic data card number 140 is generally assigned by an issuing state and may be assigned via a random number generating program, comprising of numerals, characters, alphanumeric characters or any other unique identifiers that are known and used in the arts. In some embodiments, the card number 140 is similar to the numbering algorithm used for state issued driver's license numbers, which on occasion incorporate state identification information and social security information incorporated therein. Prior to being issued to the card holder, the electronic data card number 140 may be recorded by the issuing state as another means of identifying the card holder.

Electronic data card 102 may also include other indicia of identification, e.g. card holder's identification information 122. As used herein, identification information 122 may include but is not limited to any one or more of the following: name, address, date of birth, sex, issue date, height, and the like. In some embodiments, card holder's name and other identification information 122 may or may not be printed on the electronic data card's exterior 142 and/or stored within the electronic data card's memory means 120. In other embodiments, the card holder's identification information 122 is absent from the card's exterior 142.

Card holder's identity may also be verified to the appropriate authorities using the immigration information 116 stored thereon. For example, in instances where the biometric verification means 106 includes a fingerprint scanner, the electronic data card holder may be required to submit an in person biometric sample 110 using the same finger(s) previously used to obtain at least one valid biometric sample 110 stored thereon as the biometric identifier 104. If the card holder submits a biometric sample 110 that fails to match the biometric identifier 104, the authorities can take the appropriate action to verify that the card holder is authorized to be in possession of the electronic data card 102 and/or authorized to cross the border.

Figure 3:
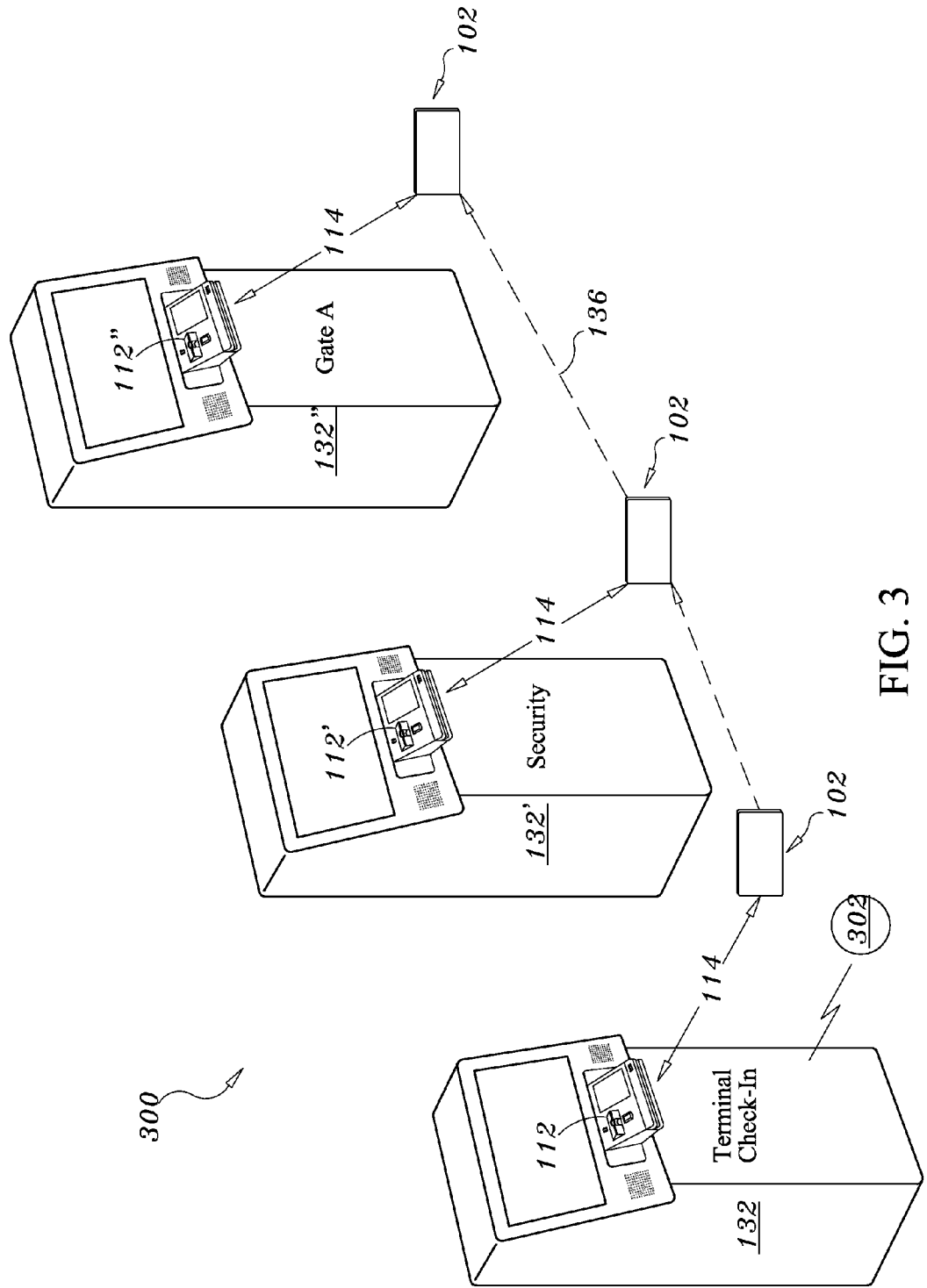
FIG. 3 is an exemplary system of the invention according to one embodiment.

In some embodiments, the electronic data card 102 may include GPS location determining means 144, e.g. a GPS transponder, for determining the location of the electronic data card 102 with encoding means 146 for encoding the location into an electronic signal using e.g. a computer processor 108, e.g. a microprocessor, which is transmitted to an authorized institution where the transmitted electronic signal 302 (as shown in FIG. 3) is decoded and the location of the electronic data card 102 or use activity may be monitored in real-time. Therefore, the location of the electronic data card 102 and as such the location of the electronic data card holder may be determined in real-time via a global satellite system, where the information, i.e. the longitude and latitude coordinates, may be stored in the GPS location information 210 (as shown in FIG. 2).

FIG. 2 illustrates, by way of example, collectively the electronic information stored within the electronic data card 102 according to one embodiment of the system 200, e.g. card number 140, security parameters 202 and immigration information 116, card validation information 204, location activity log 206, and Global Positioning System ("GPS") location information 208. Immigration information 116 is retained within the electronic data card's memory means 120, which preferably provides sufficient processing resources to facilitate communication and maintain adequate security for the electronic data card 102. Immigration information 116 includes but is not limited to: background report 124, visa restrictions 126 and travel authorization 118.

In some embodiments, background report 124 may be stored in electronic data card's memory means 120, which may include a report based on a verification of the information provided by the card holder prior to obtaining an electronic data card 102. Background report 124 may include but is not limited to information concerning a criminal background check, verification of local address, bank account information, verification of education and the like. Included in the background report 124 may be an electronic flag indicating the pre-approved status of the card holder showing whether card holder qualifies for entering a country's borders and if not, then the reasons for prohibited travel.

Visa restrictions 126 for the card recipient may be stored thereon, which may include but is not limited to pre-approved status, photograph, issuing country, passport number, surname, given names, address, nationality, date of birth, place of birth, gender, race, height, color of eyes, passport number, date of issue, passport expiration date, occupation, place of issue, authority or endorsement, contact information, current visa information (if applicable), and type of visa and the like. It will be understood that access to the visa restrictions 126 field may be provided in a hierarchical form associated with security provisions to protect the information stored on the electronic data card 102.

Travel authorization 118 may include but is not limited to a list of countries that card holder is authorized to enter; limitations placed on card holder's ability to travel across various borders and the like where applicable.

Card number 140 may act as a unique identifier allowing the system 100 to uniquely recognize and register each electronic data card 102 that has been assigned and issued to individual card holders. Card validation information 204 may include for example the issue date that corresponds to the date the electronic data card 102 was issued to the card holder, and/or card expiration date 210 (not shown), i.e. the last valid date for use of the electronic data card 102 as set by the issuing authority. Activity log 206 may optionally contain a record of all uses of the electronic data card 102, e.g. embassies for which the electronic data card 102 was presented as a means of identifying the card holder's pre-authorized status for immigrating into a country's borders. Security parameters 202 may be provided, that may include an encrypted key(s) of military grade, and or security codes, biometric security features, and/or other security mechanisms.

FIG. 3 is an exemplary system 300 of the invention according to one embodiment. In some embodiments, the electronic data card 102 may include GPS location determining means 144, e.g. a GPS transponder, for determining the location of the electronic data card 102 with encoding means 146 for encoding the location into an electronic signal 302 using e.g. a computer processor 108, e.g. a microprocessor, which is transmitted to an authorized institution where the transmitted electronic signal 302 is decoded and the location of the electronic data card 102 or use activity may be monitored in real-time. Therefore, the location of the electronic data card 102 and as such the location of the electronic data card holder may be determined in real-time via a global satellite system, where the information, i.e. the longitude and latitude coordinates, may be stored in the GPS location information 210.

In some embodiments, several card readers 112, 112', 112" are strategically located on the airport premises wherein each card reader 112 is numbered signifying a specific location, such that the electronic data card 102 may be read once it is within a predetermined spatial proximity to the card readers 112, 112', 112" and the location of the card holder is therefore easily determined. In an exemplary embodiment, once the card holder checks in for departure or the electronic card 102 is read at the earliest entry point of the airport, e.g. at the Terminal Check-In Counter, the system 300 automatically plots a tracking route 136 to at least one or more departure gate(s) for the authorized card holder, with latitude for slight deviations thereof. When the electronic data card 102 is within the predetermined spatial proximity 114, the card readers 112, 112', 112" positioned along the tracking route 136 reads the electronic data card 102 and is therefore able to locate the whereabouts of the card holder. As such, if the card holder is scheduled to depart from Terminal A, Gate A9, a reasonable tracking route 136 may include proceeding directly from the entrance of that terminal to security clearance and traveling though Terminal A, from Gates A1-A9, with a built-in deviation to include up to Gates A20, where the food may be purchased or representative of the last gate within Terminal A. In that instance, one would not expect to locate card holder in a remote terminal, e.g. Terminal H, which may be a considerable distance from where the card holder was first located or checked in. Such an instance may be cause for an alarm to be triggered to follow protocol to check if for instance the card holder is a flight risk or there is some other plausible reason for being located in a remote terminal, e.g. departure redirected to another gate.

As the electronic data card 102 is being read by any one or more card readers 112, 112' at any one location along the tracking route 136, system 300 generates a location activity log 206 which is stored for future reference. Thus, system 300 can determine authorization for the electronic data card 102 and by extension the card holder at any one location based on the last card reader's 112 location that read the electronic data card 102 and if necessary issue an alarm for detected unauthorized presence of the electronic data card 102 and as such the card holder at any one location.

Methods

Figure 4:
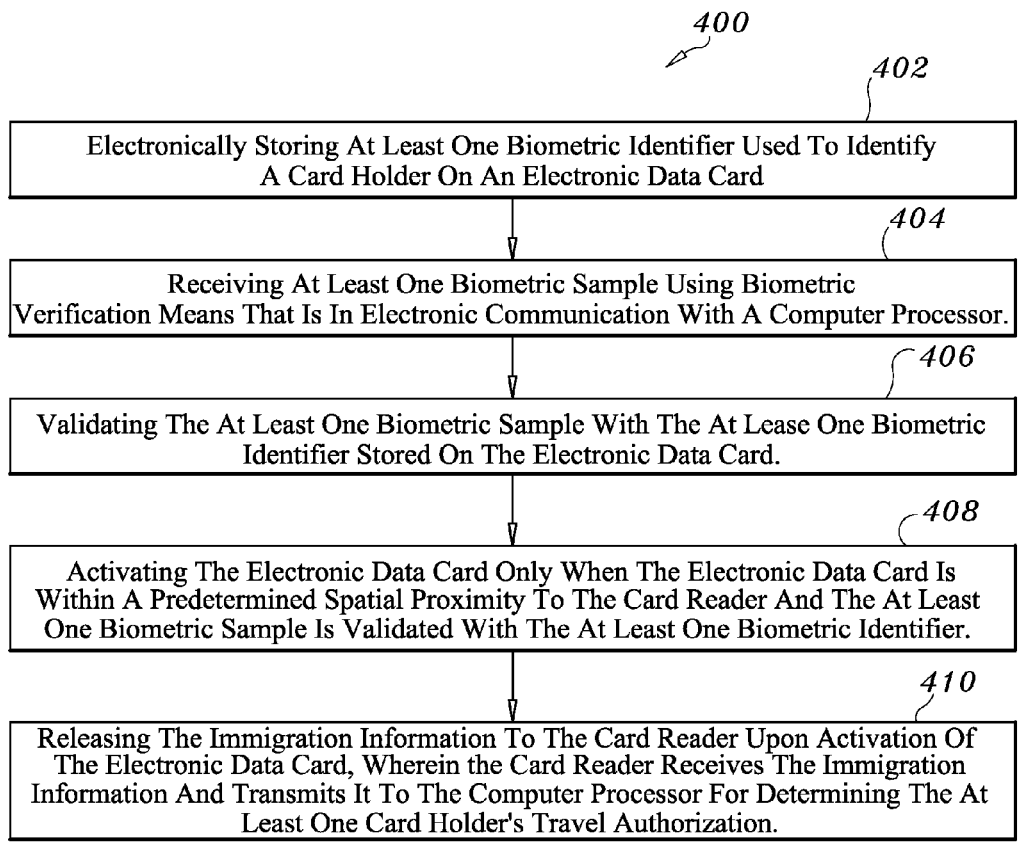
FIG. 4 is a sample flowchart of an exemplary method of verifying an individual's authorization to cross borders according to one embodiment.

FIG. 4 is a sample flowchart of an exemplary method 400 of verifying an individual's authorization to cross borders according to one embodiment. Method 400 comprises of electronically storing at least one biometric identifier 104 used to identify a card holder on an electronic data card 102 (step 402). As previously discussed, electronic data card 102 is selected from the group of electronic devices consisting essentially of programmable smart cards, memory cards, and processor cards, with at least one memory means 120 embedded therein. Such memory means 120 may include a hardware component, e.g. storage hardware, in electrical communication with at least one computer processor 108. Storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash cards, memory chips, and the like, and random access memory. In one embodiment, the at least one memory means 120 may comprise of both hardware and software components.

Memory means 120 is configured for storing temporarily or permanently any one or more of the following thereon: card number 140, security parameters 202, card validation information 204, location activity log 206, GPS location information 208, at least one biometric sample 110, at least one biometric identifier 104, immigration information 116 and/or identification information 122. Immigration information 116 includes but is not limited to: background report 124, visa restrictions 126 and travel authorization 118 that may include for instance issuing state, expiration date, and endorsement and/or other immigration information 116 that are normally used in the arts. Identification information 122 as used herein includes any one or more of the following: name, address, date of birth, sex, issue date, height and the like.

Method 400 further comprises of receiving at least one biometric sample 110 from the card holder using biometric verification means 106 that is in electronic communication with a computer processor 108 (step 404) as previously discussed herein; and validating the at least one biometric sample 110 with the at least one biometric identifier 104 stored on the electronic data card 102 (step 406).

Method 400 comprises activating the electronic data card 102 only when the electronic data card 102 is within a predetermined spatial proximity 114 to the card reader 112 and the at least one biometric sample 110 is validated with the at least one or more biometric identifiers 104, 104' stored on the electronic data card 102 (step 408); and releasing the immigration information 116 to the card reader 112 upon activation of the electronic data card 102, wherein the card reader 112 receives the immigration information 116 and transmits it to the computer processor 108' for determining the at least one card holder's travel authorization 118 (step 410).

In some embodiments, method 400 also comprises of providing biometric verification means 106 configured for receiving at least one recently provided biometric sample 110 from the card holder for validation with the at least one biometric identifier 104 stored on the electronic data card 102. Biometric verification means 106 may include at least one computer processor 108' positioned within and may be a standalone device or biometric verification means 106 may be incorporated into a kiosk 132 in electronic communication with a computer processor 108 and a card reader 112.

Card reader 112 may be adapted with electrical contacts 128' for establishing wired and/or wireless connectivity to electronic data cards 100, 100', 100'' and/or the computer processor 108. Alternatively, a wireless connection may be established, wherein communication access is established in response to a programmable predetermined spatial proximity 114 for the electronic data card 102 to be activated. In some embodiments, the card reader 112 is required to be no more than 1.5 inches away from the electronic card 102 in order for it to be activated by the card reader 112, which helps to minimize unauthorized capturing of the information stored thereon. In other embodiments, the programmable predetermined spatial proximity 114 may be less than or more than 1.5". In either event, card reader 112 may be programmed to function at the desired predetermined spatial proximity 114. Card reader 112 may also be integrated within a computer processor 108 (e.g. with a slot for wired card connectivity), an external device (e.g., USB connection to a small housing), or be integrated into other devices, e.g. a kiosk 132 that are known and used in the arts.

Computer processor 108, e.g. a network enabled computer processor 108, i.e. a laptop or personal digital assistant subject to wired/wireless connectivity is configured with an application program 136 stored thereon to facilitate communications between the electronic data card 102 and the computer processor 108 through the card reader 112. Application program 136 may comprise in part of a browser, such as for use on a personal computer processor 108 or similar browsing device as previously described in conjunction with FIGS. 1-2.

Computer processor 108, 108' may also comprise of computer executable instructions 138, 138' executable by the computer's at least one computer processor 108, 108' and operative to perform the system 100 and methods disclosed herein. Computer executable instructions 138, 138' may be loaded directly on the computer's processor 108, 108', or may be stored in memory means 120,120' such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions 138, 138' may be any type of computer executable instructions 138, 138', which may be in the form of a computer program, the program being composed in any suitable programming language or source code, such as C++, C, JAVA, JavaScript, HTML, XML, and other programming languages. Computer executable instructions 138, 138' executable by the at least one computer processor 108' is configured for performing any one or more of the following: controlling the card reader 112 to activate the electronic data card 102; controlling the card reader 112 to receive the immigration information 116 stored thereon upon validation of the biometric sample 110 with the biometric identifier 104 stored thereon and/or controlling the card reader 112 to transmit the immigration information to the computer processor 108 for verification of the at least one card holder's travel authorization 118.

Figure 5:
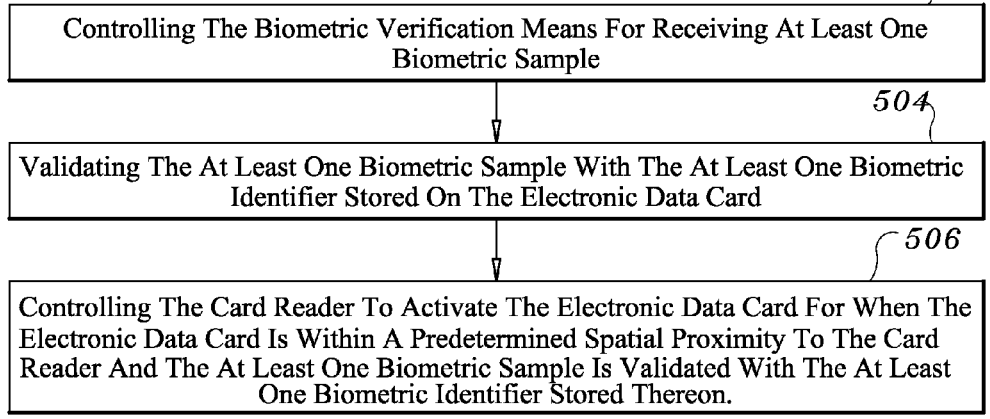
FIG. 5 is a sample flowchart of a block diagram of an exemplary method of processing an electronic data card in accordance with one embodiment.

FIG. 5 is a sample flowchart of a block diagram of an exemplary method 500 of processing an electronic data card in accordance with one embodiment. In some embodiments, method 500 comprises of the processor 108 controlling the biometric verification means 106 for receiving at least one biometric sample 110 (step 502); validating the at least one biometric sample 110 with the at least one biometric identifier 104 stored on the electronic data card 102 (step 504) and controlling the card reader 112 to activate the electronic data card 102 for when the electronic data card 102 is within a predetermined spatial proximity 114 to the card reader and the at least one biometric sample 110 is validated with the at least one biometric identifier 104 stored thereon (step 506).

Figure 6:
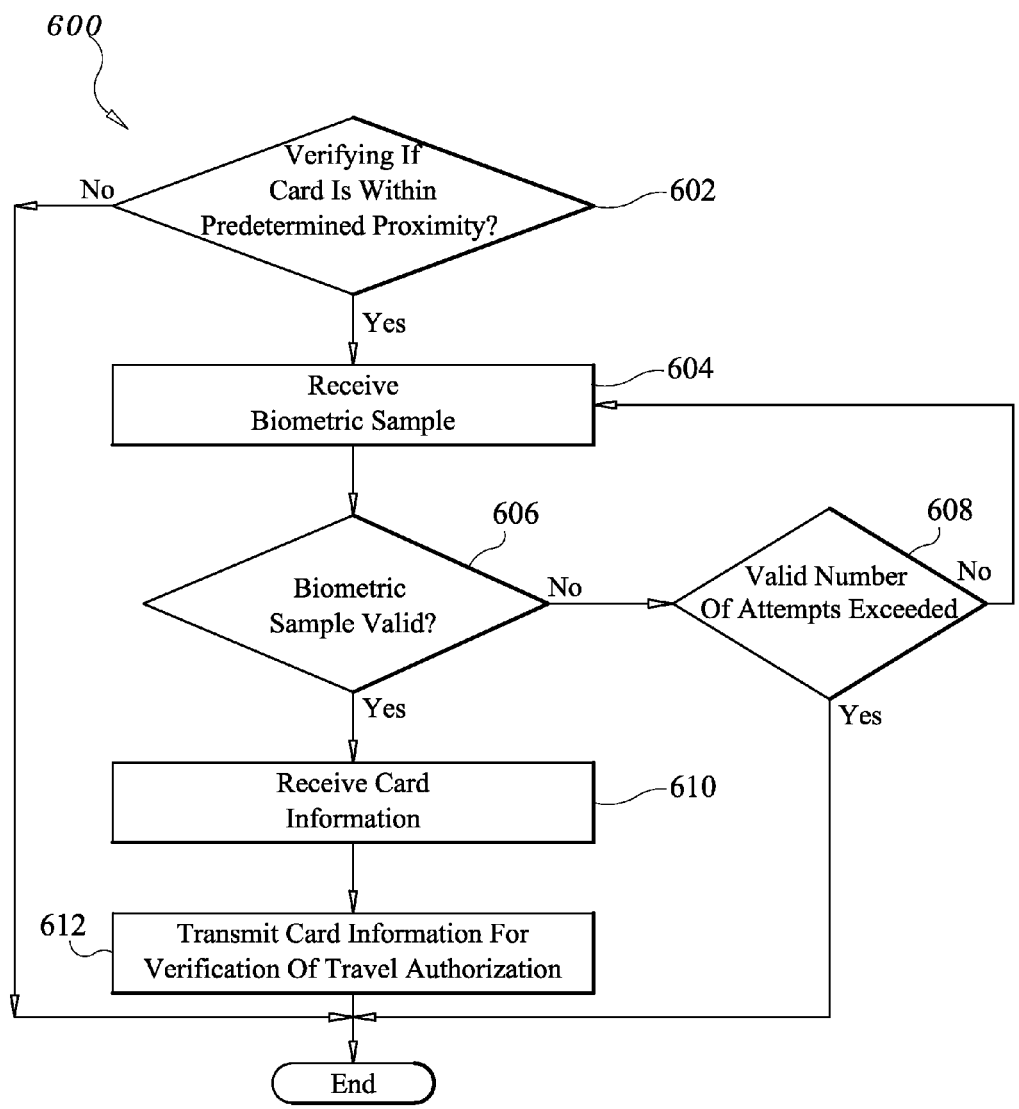
FIG. 6 is a sample flowchart of an exemplary method of determining the electronic card holder's authorization in accordance with one embodiment.

FIG. 6 is a sample flowchart of an exemplary method 600 of determining the electronic card holder's authorization in accordance with one embodiment. Method 600 comprises of the card reader 112 verifying whether the electronic data card 102 is within the predetermined proximity 114 (step 602) to be able to be read. If the card 102 is outside of the predetermined proximity 114, the card reader 112 does not activate or continue reading the card 102 creating no receipt and/or transmission of the information stored thereon. As such, method 600 self-aborts. However, if the electronic data card 102 is within the predetermined proximity 114, method 600 comprises receiving biometric sample 110 (step 604) by the biometric verification means 106 wherein method 600 verifies if the biometric sample 110 matches the biometric identifier 104 stored on the electronic data card 102 (step 606). If the biometric sample 110 is valid (step 606), method 600 comprises proceed to step 610. Otherwise, method 600 allows card holder to provide another valid biometric sample 110 for validation so long as the valid number of attempts have not been exceeded (step 608), in which case method 600 returns to step 604. If the valid number of attempts has been exceeded (step 608) method 600 self-aborts providing personnel with the opportunity to follow through with its protocol for determining whether the electronic data card 102 is at issue or the card holder's identity may be fraudulent and/or the card holder's travel authorization 118 may be unauthorized, revoked or require further investigation.

If the biometric sample 110 is valid, card reader 112 receives card holder's information (step 610) and transmits cardholder's information to the computer processor 108 for verification of the card holder's travel authorization (step 612). The card reader 112 requires the electronic data card 102 to be within the predetermined proximity in order for the card to be read, which prevents external card readers 302, 302' from skimming the immigration information 116 stored thereon, keeping the information secure.

Once the card holder's immigration information 116 is released, method 600 further comprises receiving the card holder's immigration information 116 stored on the electronic data card 102 upon validation of the biometric sample 110. In some embodiments, the card reader 112 transmits the card holder's identification information and the computer via an application program 136 accesses law enforcement records, e.g. a state's department of motor vehicle records and/or immigration records, for determining the card holder's authorization to enter a country's borders. Method 600 may further comprise of accessing law enforcement records for determining the card holder's travel authorization 118 to enter a country's borders.

Figure 7:
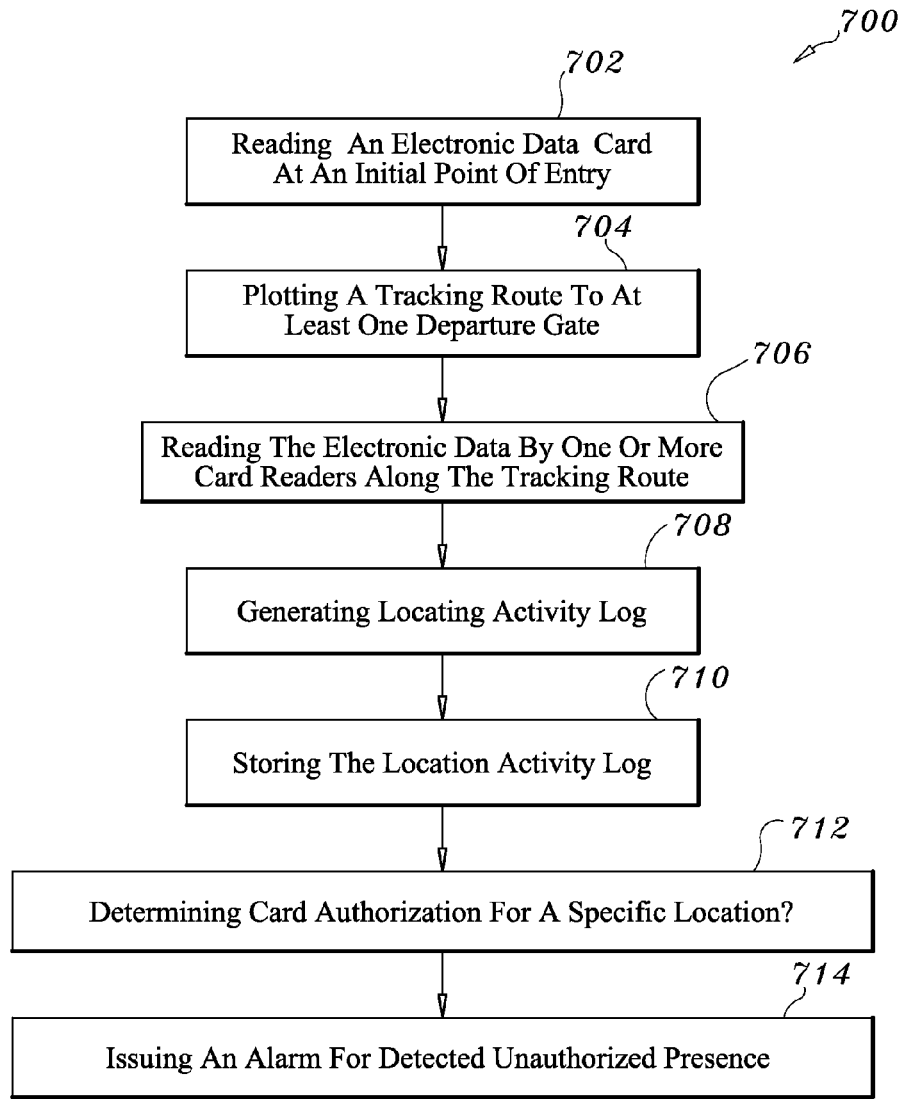
FIG. 7 is a block diagram representing an apparatus according to the various embodiments.

FIG. 7 is a sample flowchart of an exemplary method 700 in accordance with one embodiment. Method 700 comprises reading an electronic data card 102 at an initial point of entry (step 702) and plotting a tracking route 136 to at least one departure gate (step 704). Along the tracking route 136 are several card readers 112, 112' that automatically reads the electronic data card 102 for determining the whereabouts of the electronic card holder at the tracked location, e.g. the airport. As such, method 700 comprises reading the electronic data card 102 by one or more card readers 112, 112' along the tracking route 136 (step 706) that was plotted for this electronic card 102, generating location activity log 206 (step 708) and storing the location activity log 206 as tracked (step 710). In this manner the whereabouts of the card holder is readily determinable based on the readings along the tracked route 136 or even outside of the tracked route 136 as the card readers 112, 112' are location based.

Method 700 further comprises determining the electronic data card's 102 authorization to be in a specific location (step 712). If the card holder is in an unauthorized location, method 700 comprises issuing an alarm for detected unauthorized presence of the electronic data card 102 at a specific location (step 714) according to immigration protocol. However, if the card holder is in an authorized location, no action will be taken and the electronic data card 102 continues to be read until card holder departs.

Hardware and Operating Environment

This section provides an overview of exemplary hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the methods 400, 600 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 8 below.

Figure 8:
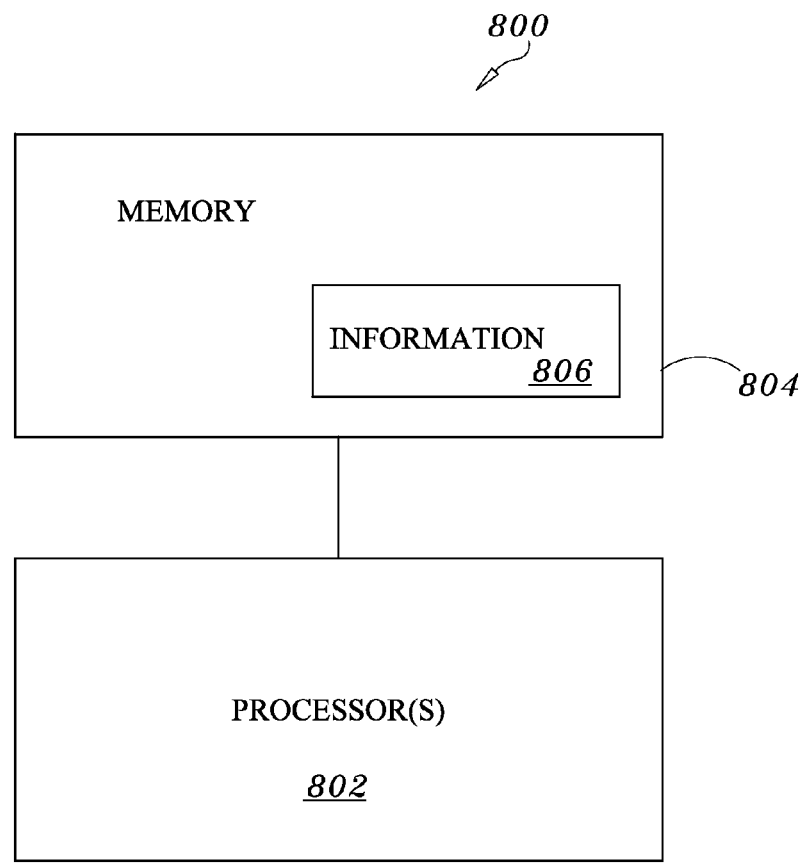
FIG. 8 is a block diagram representing an article according to various embodiments.

FIG. 8 is a block diagram representing an article according to various embodiments. Such embodiments may comprise a computer, a memory system, a magnetic or optical disk, some other storage device, or any type of electronic device or system. The article 800 may include one or more processor(s) 802 coupled to a machine-accessible medium such as a memory 804 (e.g., a memory including electrical, optical, or electromagnetic elements). The medium may contain associated information 806 (e.g., computer program instructions, data, or both) which, when accessed, results in a machine (e.g., the processor(s) 802) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While certain novel features of this invention have been shown and described and are pointed out in the annexed claims, it is not intended to be limited to the details above, since it will be understood that various omissions, modifications, substitutions and changes in the forms, method, steps and system illustrated and in its operation can be made by those skilled in the art without departing in any way from the spirit of the present invention.

What is claimed is:

1. A system comprising of:
   (a) an electronic data card configured for electronically storing thereon at least one biometric identifier used to identify a card holder;
   (b) biometric verification means in electronic communication with a computer processor that receives at least one biometric sample and validates the at least one biometric sample with the at least one biometric identifier stored on the electronic data card; and
   (c) a card reader in electronic communication with the computer processor, biometric verification means and the electronic data card, wherein the card reader is configured for reading an electronic data card at an initial point of entry and activating the electronic data card only when the electronic data card is within a predetermined spatial proximity to the card reader and the at least one biometric sample is validated with the at least one biometric identifier, wherein only upon validation of the at least one biometric sample, the electronic data card releases the immigration information to the card reader, which receives the immigration information and transmits it to the computer processor for plotting a tracking route to at least one departure gate where the electronic data card is automatically read by one or more card readers positioned along the tracking route for determining the at least one card holder's authorization at a location after the initial point of entry.

2. The system of claim 1 further comprising:
(a) an application program executable on the computer; and
(b) computer executable instructions executable by the at least one computer processor and configured for performing any one or more of the following:
  (i) controlling the card reader to activate the electronic data card;
  (ii) controlling the card reader for receiving the immigration information upon validation of the biometric sample; and
  (iii) controlling the card reader for transmitting the immigration information to the computer processor for verification of the at least one card holder's travel authorization.

3. The system of claim 1, wherein the electronic data card is selected from the group of electronic devices comprising essentially of smart cards, memory cards and processor cards.

4. The system of claim 1, wherein the biometric verification means housed in an electronic kiosk in electronic communication with the card reader for reading the electronic data card.

5. The system of claim 1, wherein the electronic data card includes memory means that may include any one or more of the following stored thereon: card number, security parameters, card validation information, activity log, global positioning system location information, at least one biometric sample, at least one biometric identifier, immigration information or identification information.

6. The system of claim 1, wherein communication access between the electronic data card and the computer or the card reader is established by manual activation of the card reader.

7. The system of claim 5, wherein identification information includes but is not limited to: name, address, date of birth, sex, issue date, and height.

8. The system of claim 1, wherein the biometric verification means includes but is not limited to: fingerprint recognition means, hand geometry recognition means, palm geometry recognition means, iris recognition means, retina recognition means, speech recognition means.

9. The system of claim 1, wherein the electronic data card is configured for communicating with the computer or the card reader in any of the following manner: wirelessly or wired.

10. The system of claim 1, wherein the electronic data card is configured for being accessed by the application program executable on the computer.

11. The system of claim 1, wherein the predetermined proximity is programmable for a range comprising of 1 to 1.5 inches from the card reader.

12. A method comprising:
(a) electronically storing at least one biometric identifier used to identify a card holder on an electronic data card;
(b) receiving at least one biometric sample using biometric verification means that is in electronic communication with a computer processor;
(c) validating the at least one biometric sample with the at least one biometric identifier stored on the electronic data card;
(d) reading an electronic data card at an initial point of entry and activating the electronic data card only when the electronic data card is within a predetermined spatial proximity to the card reader and the at least one biometric sample is validated with the at least one biometric identifier; and
(e) releasing the immigration information to the card reader only upon activation of the electronic data card, wherein the card reader receives the immigration information and transmits it to the computer processor for plotting a tracking route to at least one departure gate where the electronic data card is automatically read by one or more card readers positioned along the tracking route for determining the at least one card holder's authorization at a location after the initial point of entry.

13. The method of claim 12, wherein the electronic data card includes memory means that may include any one or more of the following stored thereon: card number, security parameters, card validation information, activity log, global positioning system location information, at least one biometric sample, at least one biometric identifier, immigration information or identification information.

14. The method of claim 12, wherein immigration information includes but is not limited to: background report, visa restrictions and travel authorization.

15. The method of claim 12, wherein identification information includes but is not limited to: name, address, date of birth, sex, issue date, and height.

16. The method of claim 12, wherein the biometric verification means includes but is not limited to: fingerprint recognition means, hand geometry recognition means, palm geometry recognition means, iris recognition means, retina recognition means, speech recognition means.

17. The method of claim 12, wherein the electronic data card is configured for communicating with the computer or the card reader in any of the following manner: wirelessly or wired.

18. The method of claim 12, wherein the electronic data card is configured for being accessed by the application program executable on the computer.

19. A method comprising:
(a) reading an electronic data card at an initial point of entry and activating the electronic data card when the electronic data card is within a predetermined spatial proximity to the card reader and the at least one biometric sample is validated with the at least one biometric identifier, wherein upon validation of the at least one biometric sample, the electronic data card releases the immigration information to the card reader, which receives the card holder's immigration information stored on the electronic data card only upon validation of the biometric sample and transmits it to the computer processor;
(b) plotting a tracking route to at least one departure gate;
(c) reading the electronic data card by one or more card readers positioned along the tracking route;
(d) generating a location activity log; and
(e) determining authorization for the electronic data card at a location.

20. The method of claim 19, further comprising storing the location activity log as tracked.

21. The method of claim 19, further comprising issuing an alarm for detected unauthorized presence of the electronic data card at a specific location.

22. The method of claim 19, further comprising accessing law enforcement records for determining the card holder's authorization to enter a country's borders.

\* \* \* \* \*